Aug. 15, 1967      R. A. GRIMM      3,336,519
BATTERY CHARGE INDICATOR SYSTEM

Filed March 30, 1965      2 Sheets-Sheet 1

INVENTOR.
Robert A. Grimm
BY C. R. Meland
His Attorney

Aug. 15, 1967     R. A. GRIMM     3,336,519
BATTERY CHARGE INDICATOR SYSTEM
Filed March 30, 1965     2 Sheets-Sheet 2

INVENTOR.
Robert A. Grimm
BY C. R. Meland
His Attorney

United States Patent Office 3,336,519
Patented Aug. 15, 1967

3,336,519
BATTERY CHARGE INDICATOR SYSTEM
Robert A. Grimm, Flint, Mich., assignor to General Motors Corporation, Detroit, Mich., a corporation of Delaware
Filed Mar. 30, 1965, Ser. No. 443,937
6 Claims. (Cl. 320—48)

ABSTRACT OF THE DISCLOSURE

In a preferred embodiment a battery charging circuit is provided with an indicating circuit including a resistor connected in series between a battery terminal and a generator output. A circuit including a pair of transistors is connected across the resistor to selectively energize a signal lamp in response to either battery charging or discharging current passing through the resistor.

This invention relates to electrical indicator systems and more particularly to a transistor indicator system which is capable of indicating a battery discharge current in a battery charging system.

One of the objects of this invention is to provide an indicator system for a battery charging system which is capable of indicating a condition where a battery is discharging through a load.

Another object of this invention is to provide an indicator system for a motor vehicle electrical system that is capable of indicating a condition where a battery is discharging and where the indicating system utilizes a small resistor as a sensing element connected in the discharge path of the battery.

Still another object of this invention is to provide a transistorized battery discharge indicator which utilizes a small resistor connected in the discharge path of the battery as a sensing element.

Further objects and advantages of the present invention will be apparent from the following description, reference being had to the accompanying drawings wherein preferred embodiments of the present invention are clearly shown.

Figure 1:
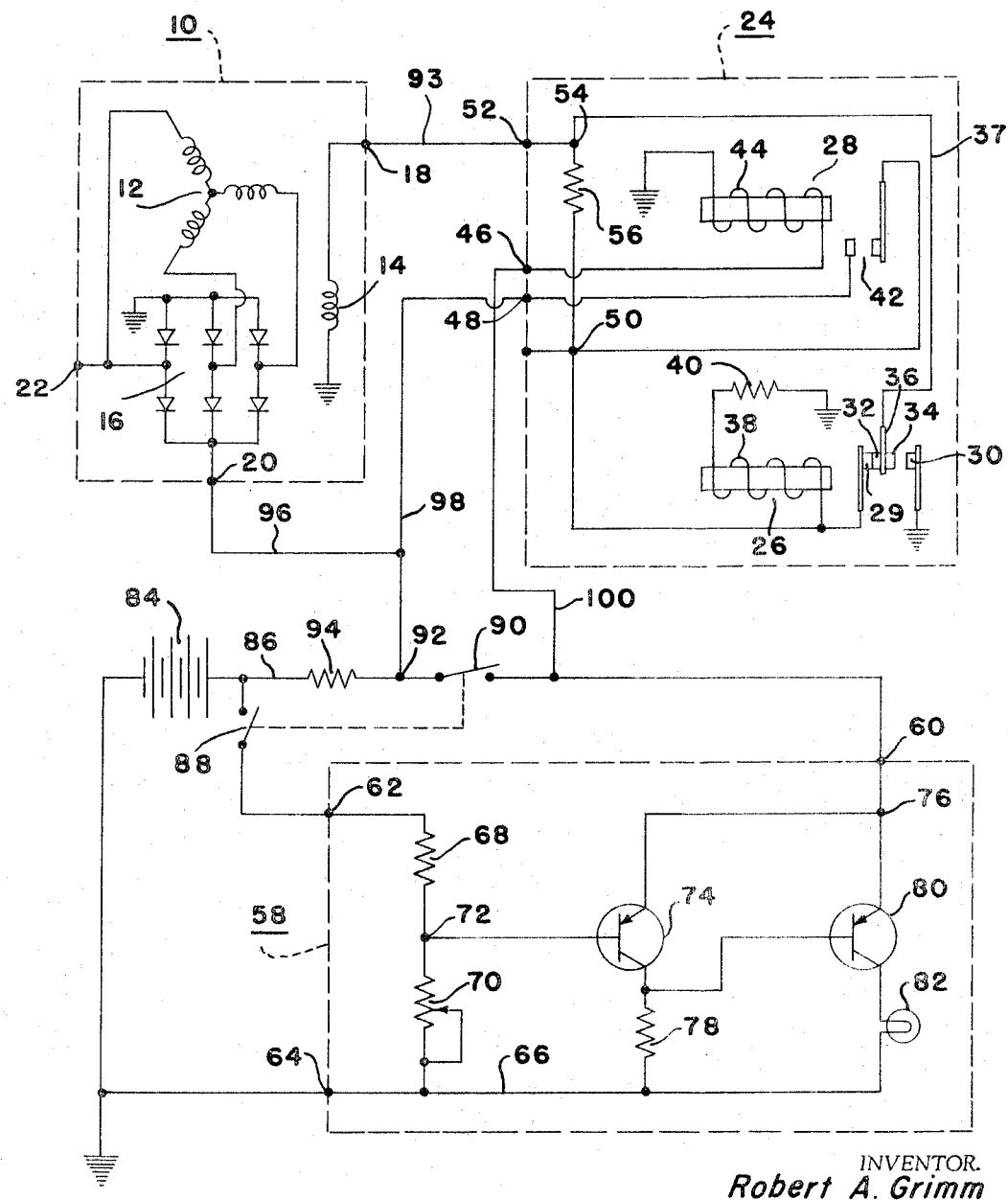
FIGURE 1 is a schematic circuit diagram of a battery discharge indicator made in accordance with this invention.

Referring now to the drawings and more particularly to FIGURE 1, the reference numeral 10 generally designates a diode-rectified alternating current generator which is used to supply the electrical loads on a motor vehicle. This diode-rectified alternating current generator includes a three phase Y-connected winding 12 and a field winding 14. The three phase winding 12 is connected with a three phase full-wave bridge rectifier 16 which preferably is formed of six silicon diodes.

The power unit 10 has a field terminal 18 connected with field winding 14 and has a positive direct current output terminal 20 connected with the positive side of the bridge rectifier 16. The negative side of the bridge rectifier 16 is grounded as shown and the power unit 10 has a relay terminal 22 connected between two diodes and not used in the circuit to be described.

The electrical system shown in FIGURE 1 includes a regulating device generally designated by reference numeral 24. This regulating device includes a voltage regulating relay 26 and another relay 28. The voltage regulating relay includes fixed contacts 29 and 30 disposed on opposite sides of contacts 32 and 34 which are carried by a movable armature 36. The voltage regulating relay includes a coil winding 38 and a resistor 40. The other relay 28 includes contacts 42 and a relay coil 44.

It is seen that one side of the relay coil 44 is grounded while the opposite side of this relay coil is connected with a relay terminal 46. The relay contacts 42 are connected between terminal 48 and a junction 50.

The relay contact 30 of the voltage regulator is grounded whereas contact 29 is connected with one side of voltage regulator coil 38 and with junction 50. The movable contacts 32 and 34 of the voltage regulator are connected with a field terminal 52 which is connected with junction 54. A resistor 56 is connected between junctions 50 and 54.

The electrical system of this invention includes an indicator unit generally designated by reference numeral 58. The indicator unit 58 has terminals 60, 62 and 64. The terminal 64 is connected with a conductor 66. A voltage divider is connected between terminal 62 and conductor 66 and includes a fixed resistor 68 and an adjustable resistor 70. The junction 72 located between resistors 68 and 70 is connected with the base of a PNP transistor 74. The emitter of transistor 74 is connected with junction 76 while the collector of transistor 74 is connected with conductor 66 through resistor 78.

The indicator 58 includes another PNP transistor 80. The collector of transistor 80 is connected to one side of a signal lamp 82 the opposite side of this lamp being connected with conductor 66. The base of transistor 80 is connected with the collector of transistor 74 and the emitter of transistor 80 is connected with junction 76 and terminal 60.

The battery for the motor vehicle electrical system is designated by reference numeral 84. The negative side of battery 84 is grounded as shown and it is seen that the terminal 64 of indicator 58 is also grounded. The positive side of battery 84 is connected with a conductor 86.

A manually operable switch 88 is connected between conductor 86 and junction 62. The switch 88 is coupled with an ignition switch 90 which can control the energization of the ignition system on a motor vehicle. The contacts 80 and 90 can be part of the ignition switch or could be other manually operable switches and in any event, they are both closed when ignition power is supplied to the ignition system of the motor vehicle. Thus whenever the engine is running, the switches 88 and 90 are closed and are opened when the ignition system is off.

One side of switch 90 is connected with junction 92. A resistor 94 is connected between conductor 86 and junction 92. The junction 92 is connected with the positive direct current output terminal of the bridge rectifier by a conductor 96. A conductor 98 connects conductor 96 with the terminal 48 of the regulator 24.

The opposite side of the ignition switch is connected with terminal 46 of the regulator 24 by a conductor 100. This conductor 100 is also connected with terminal 60 of the indicator 58.

When the diode-rectified alternator of FIGURE 1 is being driven by an engine, it will be appreciated that direct current will be supplied between terminal 20 and ground. This voltage is held substantially constant at a value, for example, of 14 volts in a 12 volt system by the voltage regulator 26 which controls the amount of current supplied to the field winding 14 in accordance with the voltage sensed between junction 50 and ground. The electrical loads for the motor vehicle are supplied between conductor 96 and ground and the battery 84 is supplied with charging current via terminal 20, conductor 96, junction 92, resistor 94 and conductor 86.

The operation of the indicator 58 will now be described it being understood that the indicating lamp 82 operates to indicate whether or not the battery is being charged.

Assuming that the driver of a motor vehicle desires to start the engine, he closes switches 88 and 90. When this happens, the relay coil 44 is energized to close contacts 42 and field current can now be supplied to the field winding 14 from the battery 84 through conductor 86, resistor 94, junction 92, conductor 98, terminal 48, contacts 42, junction 50, closed contacts 29 and 32, conductor 37, terminal 52, conductor 93, terminal 18 and then through the field winding 14 to ground. With switch 88 closed, the potential of the battery 84 is applied across resistors 68 and 70. The current flowing through resistor 94 drives terminal 60 more negative and the transistor 74 is therefore biased to a nonconductive condition. With transistor 74 nonconductive, the base of transistor 80 will be substantially at ground potential. Since the base of transistor 80 is at ground potential, it would normally be thought that it would conduct in its emitter-collector circuit but since the collector of transistor 80 is also essentially at ground potential, the battery voltage is dropped across the emitter to base of transistor 80 and the lamp 82 is not energized indicating that the battery is discharging.

When the engine is started, the diode-rectified alternator 10 will produce an output voltage which is sufficient to charge the battery 84 and as a result, current will now flow in an opposite direction through resistor 94 so that junction 92 will be positive with respect to conductor 86. This will bias transistor 74 to a conductive condition and the base of transistor 80 will now be at a positive potential and therefore substantially the same potential as terminal 60. Because of the voltage drop across the emitter to collector of transistor 74, the base of transistor 80 will be slightly negative with respect to its emitter but positive with respect to its collector so that transistor 80 turns on. This will energize the signal lamp 82 indicating to the operator of the motor vehicle that the battery is being charged by the generator.

To summarize the operation of FIGURE 1, it will be appreciated that energization of the signal lamp 82 indicates that the battery is being charged by the generator and the extinguishing of lamp 82 indicates that the battery is discharging. It will also be appreciated that the sensing means for determining whether or not signal lamp 82 is lit responds to the direction of current flow through resistor 94.

Figure 2:
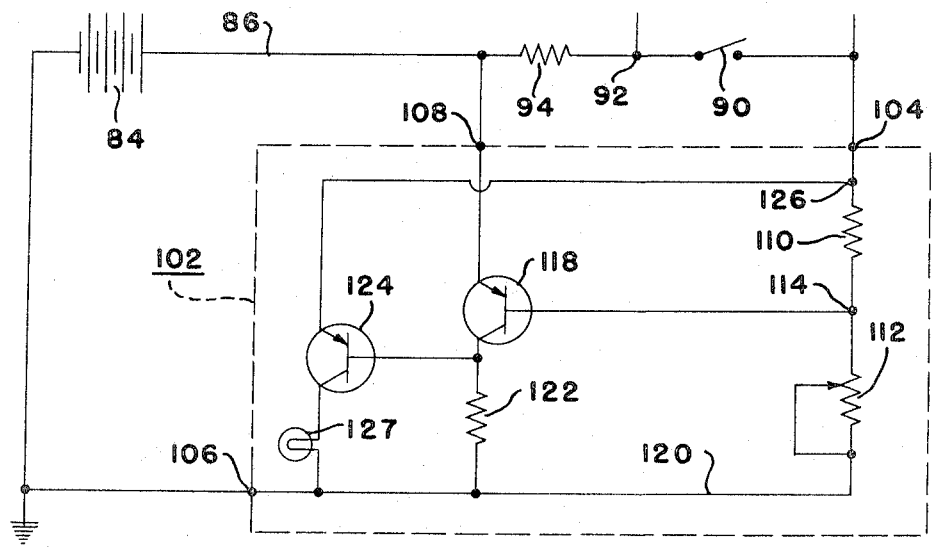
FIGURE 2 illustrates a modified indicator system made in accordance with this invention.

If a system is desired where the signal lamp is energized when the battery is discharging and is extinguished when the generator is charging the battery, the system of FIGURE 2 can be used. In FIGURE 2, only the indicator 102 is illustrated, it being understood that it will be connected in the total system in the same manner as indicator 58 in FIGURE 1. In the FIGURE 2 system, the switch 88 has been eliminated and one of the input terminals 104 of the indicator 102 is connected with one side of the ignition switch 90. Another input terminal 106 of the indicator is grounded and the other input terminal 108 is connected to one side of resistor 94.

In the FIGURE 2 system, the voltage divider 110 and 112 is connected between terminal 104 and ground. The junction 114 of the voltage divider is connected to the base of a PNP transistor 118. The emitter of transistor 118 is connected with terminal 108 while the collector of transistor 118 is connected with grounded conductor 120 via resistor 122.

The collector of transistor 118 is connected with the base of a PNP transistor 124. The signal lamp 127 is connected between the collector of transistor 124 and grounded conductor 120. The emitter of transistor 124 is connected with junction 126.

In the system of FIGURE 2, transistor 118 is biased conductive in its emitter-collector circuit when the ignition switch 90 is closed. Thus current is now flowing from the battery through resistor 94 so that terminal 108 is positive with respect to junction 92.

When transistor 118 turns on in its emitter-collector circuit, the transistor 124 is turned on to energize the signal lamp 127.

When the engine drives the diode-rectified alternator to produce an output voltage which is greater than battery voltage, the current reverses in resistor 94 so that junction 92 is now positive with respect to terminal 108. This turns off the transistor 118 to likewise turn off the transistor 124 and extinguish the signal lamp 127.

Figure 3:
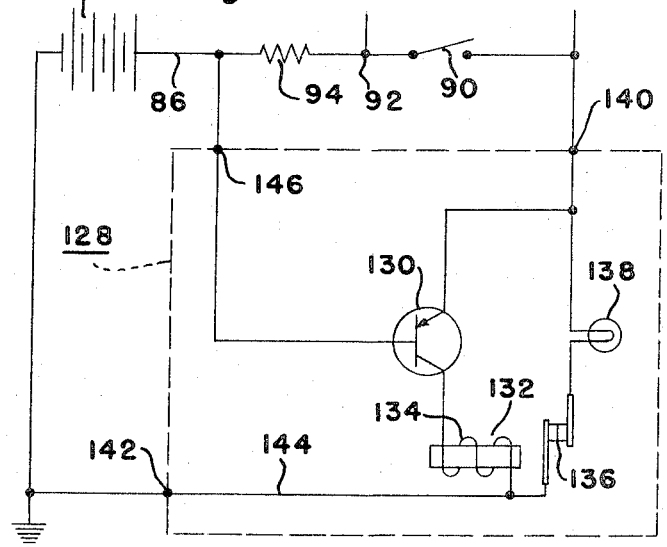
FIGURE 3 is a schematic circuit diagram of a modified indicator system made in accordance with this invention.

Referring now to FIGURE 3, another modified indicating system is illustrated which can be used with the total system of FIGURE 1. In FIGURE 3, the indicator is generally designated by reference numeral 128. The indicator 128 includes a PNP transistor 130 and a relay 132. The relay 132 has an actuating coil 134 and normally closed contacts 136. A signal lamp 138 is connected between terminal 140 and one side of the contacts 136. The opposite side of the contacts 136 are connected with terminal 142 via the conductor 144 which is grounded. The terminal 146 of the indicator 128 is connected with conductor 86 and to one side of the resistor 94.

In describing the operation of FIGURE 3, it is to be understood that it is connected with the other components of the system of FIGURE 1 which are identified by the same reference numerals in FIGURES 1 and 3.

When the ignition switch 90 is closed in FIGURE 3, current will flow from the battery 84 through resistor 94 to supply the field winding of the generator through the same path of the regulator 24 described in connection with FIGURE 1. This means that terminal 146 will be positive with respect to junction 92. The signal lamp 138 is now energized through ignition switch 90, terminal 140 and closed relay contacts 136. The voltage drop that is developed across resistor 94 is of such a polarity as to bias transistor 130 to a nonconductive condition since it drives the emitter of transistor 130 negative with respect to its base.

When the engine starts running, the diode-rectified alternator comes up to voltage and battery charging current will flow through resistor 94 from junction 92 to conductor 86. The voltage across resistor 94 now reverses its polarity and the emitter of transistor 130 now therefore becomes conductive in its emitter-collector circuit. This will energize the relay coil 134 to open the contacts 136 and therefore break the circuit for signal lamp 138. This will indicate that the generator is now charging the battery and as in previous embodiments, the direction of current flow through resistor 94 determines whether or not the signal lamp will be lit.

Figure 4:
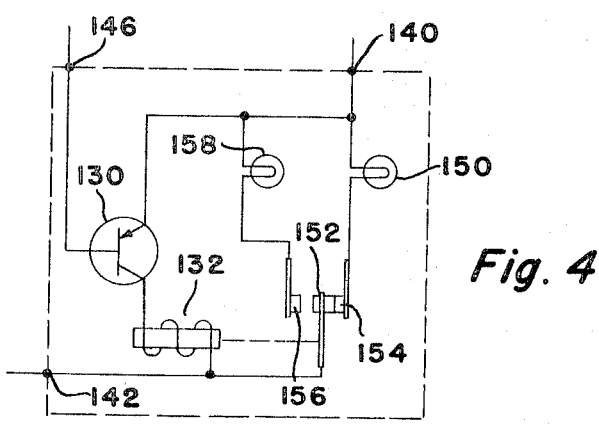
FIGURE 4 is a schematic circuit diagram of a system that can be substituted for a part of the system shown in FIGURE 3.

The system of FIGURE 3 can be further modified to include two signal lamps as is illustrated in FIGURE 4. In such a system, an additional signal lamp 150 is provided and the relay 132 includes a movable contact 152 and fixed contacts 154 and 156. In this system, the signal lamp 150 will be energized through contacts 152 and 154 whenever the generator is not charging the battery. When the generator is charging the battery, the relay coil 132 is energized to close contacts 152 and 156 and open contacts 152 and 154. This will energize a charge lamp 158 indicating that the generator is charging the battery.

One of the advantages of the FIGURE 4 system is that the lamp 150 is on when the ignition switch 90 is closed which serves as a check for lamp 150. If lamp 158 fails to light after the engine is started, it may indicate that this lamp is burned out providing that lamp 150 has become extinguished when the engine is running. If the lamp 150 fails to go off, there is some malfunction in the electrical system.

It will be appreciated by those skilled in the art that modifications can be made to the systems hereinbefore described without departing from the spirit and scope of this invention. As an example, the system of FIGURE 3 can be modified such that the relay 132 is eliminated and the signal lamp rather than being controlled by the relay contacts is connected between the collector of transistor 130 and line 144. With this modified arrangement, the signal lamp 138 would be energized when transistor 130 was conductive. This means that the signal lamp 138 would be off when the battery is discharging through resistor 94 and would be on when the battery is being charged. A further modification could be made to eliminate relay 132 by interchanging the emitter and base connections for transistor 130 and connecting the lamp 138 between the collector of transistor 130 and the lead wire 144. Thus if the emitter of transistor 138 were connected with junction 146 and the base of transistor 130 with junction 140, the arrangement would be such that the signal lamp is off when the battery is being charged and is on when the battery is discharging.

The system shown in FIGURE 3 could also be modified to use an NPN transistor rather than the PNP transistor 130. In such an arrangement, the current sensing resistor 94 is connected in the lead connecting the negative side of the battery 84 to ground. In this arrangement, the base of the NPN transistor is grounded, the emitter is connected between the resistor and the negative side of battery 84, and the relay coil is connected between the collector and junction 140. It will also be appreciated that the system of FIGURE 4 could be modified in the same manner to use an NPN transistor rather than the PNP transistor 130.

The system of FIGURE 2 can be modified to provide an arrangement wherein a PNP transistor such as transistor 118 drives an NPN transistor which would be substituted for PNP transistor 124. In such an arrangement, the base of transistor 118 would be connected directly with junction 104 and the resistors 110, 112 and 122 would be eliminated. The signal lamp 127 would be connected between the collector of the NPN transistor and junction 108. The base of the NPN transistor would then be connected with the collector of transistor 118 and the emitter of the NPN transistor would be connected with the grounded terminal 106. With the arrangement as just described, the lamp would be on when the battery is being discharged and would be off when the battery is being charged.

In each of the embodiments illustrated, the sensitivity of the system is dependent upon the value of the resistor 94 and the base to emitter voltage of transistors 74, 118 or 130. The resistor 94 has a small resistance value and could be a meter shunt, two diodes back-to-back or the resistance of the wire employed to complete the connection between the positive battery terminal and the ignition switch terminal.

It will be appreciated by those skilled in the art that additional transistors could be used where additional stages of amplification are desired.

It will also be appreciated that signalling devices other than signal lamps could be used, for example, meters, buzzers, bells and the like.

While the embodiments of the present invention as herein disclosed constitute a preferred form, it is to be understood that other forms might be adopted.

What is claimed is as follows:

1. A battery discharge indicator comprising, a battery, first and second transistors, a discharge circuit for said battery, a resistor connected in series with said discharge circuit, an electrically energizable indicating device, means connecting said indicating device and said second transistor in series across said battery, means connecting the emitter and base electrodes of said first transistor with said resistor whereby the conduction of said first transistor is controlled by the voltage drop across said resistor, and means interconnecting said first and second transistors whereby the conduction of said second transistor is controlled in accordance with the conduction of said first transistor, said indicating device being energized through said second transistor when said battery is discharging through said resistor.

2. A battery discharge indicator comprising, a battery, first and second conductors connected with opposite sides of said battery, a voltage divider connected across said conductors having a junction, a resistor connected in series with one of said conductors, one end of said resistor being connected with one end of said voltage divider, a transistor having emitter, collector and base electrodes, means connecting the emitter electrode of said transistor to an opposite side of said resistor, means connecting the base electrode of said transistor with said junction on said voltage divider, means connecting the collector of said transistor to a side of said battery opposite from the side connected with said resistor, and an electricially energizable signalling means including a second transistor having an input electrode connected with the collector of said transistor and an output electrode connected to a signal lamp.

3. A motor vehicle electrical system comprising, a source of direct current, a battery, means connecting said source of direct current and said battery whereby said source of direct current is capable of charging said battery, said means including a resistor, said resistor developing a voltage of one polarity when said battery is discharging through said resistor and developing a voltage of an opposite polarity when said source of direct current is charging said battery, first and second signalling devices, and control means interconnecting said signalling devices and said resistor, said control means causing said first signalling device to be energized and said second signalling device deenergized when the voltage developed across said resistor is of said one polarity, said control means causing said second signalling device to be energized and said first signalling device to be deenergized when the voltage developed across said resistor is of said opposite polarity.

4. The motor vehicle electrical system according to claim 3 where the first and second signalling devices are signal lamps.

5. The motor vehicle electrical system according to claim 3 where the control means includes a transistor and a relay.

6. A motor vehicle electrical system comprising, an alternating current generator having a field winding and an output winding, rectifier means having direct current output terminals connected with said output winding, a battery, first conductor means including a resistor connecting said battery across the direct current output terminals of said rectifier means, a voltage regulator including relay means with relay operated contacts, second conductor means including a pair of said relay contacts of said voltage regulator connecting the junction of said resistor and said direct current output with said generator field winding so that the field winding is energized through said second conductor means, third conductor means including a manually operable switch connecting the junction of the first and second conductor means with a relay of said voltage regulator to energize said pair of relay contacts, said resistor developing a voltage of one polarity when said field winding is being energized from said battery, said resistor developing a voltage of opposite polarity when said generator is charging said battery through said rectifier means, and means responsive to the polarity of voltage developed across said resistor for indicating whether or not said generator is charging said battery.

References Cited

UNITED STATES PATENTS

| | | | |
|---|---|---|---|
| 2,908,854 | 10/1959 | Rice | 320—61 X |
| 3,210,727 | 10/1965 | McLaughlin et al. | 320—48 X |
| 3,258,672 | 6/1966 | Godshalk et al. | 320—48 X |

JOHN F. COUCH, *Primary Examiner.*

S. WEINBERG, *Assistant Examiner.*